(12) United States Patent
Antonoff et al.

(10) Patent No.: US 7,640,308 B2
(45) Date of Patent: Dec. 29, 2009

(54) SYSTEMS AND METHODS FOR DETECTION AND REMOVAL OF METADATA AND HIDDEN INFORMATION IN FILES

(75) Inventors: Lauren Nicole Antonoff, Seattle, WA (US); Deven Gulab Hariyani, Bellevue, WA (US); Jeffrey J. Johnson, Bellevue, WA (US); Khai Weyn Ong, Bellevue, WA (US); Hani Saliba, Seattle, WA (US); Stephen J. Matlock, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 10/954,638

(22) Filed: Sep. 30, 2004

(65) Prior Publication Data

US 2006/0075041 A1   Apr. 6, 2006

(51) Int. Cl.
  *G06F 15/16* (2006.01)
  *G06F 15/173* (2006.01)
(52) U.S. Cl. ...................... 709/206; 709/224
(58) Field of Classification Search ................. 709/224, 709/206
  See application file for complete search history.

(56) References Cited

U.S. PATENT DOCUMENTS

| | | | |
|---|---|---|---|
| 6,182,081 B1 | 1/2001 | Dietl et al. | |
| 6,470,307 B1 | 10/2002 | Turney | |
| 2002/0091741 A1 | 7/2002 | Ferreira et al. | |
| 2002/0184318 A1* | 12/2002 | Pineau | 709/206 |
| 2003/0004937 A1* | 1/2003 | Salmenkaita et al. | 707/3 |
| 2003/0145017 A1 | 7/2003 | Patton et al. | |
| 2003/0167446 A1* | 9/2003 | Thomas | 715/513 |
| 2003/0182359 A1* | 9/2003 | Vorchik et al. | 709/203 |
| 2004/0111394 A1 | 6/2004 | Fish et al. | |
| 2004/0117797 A1* | 6/2004 | Brown et al. | 719/310 |
| 2004/0128552 A1 | 7/2004 | Toomey | |
| 2004/0189682 A1* | 9/2004 | Troyansky et al. | 345/700 |
| 2005/0278430 A1* | 12/2005 | Cato | 709/206 |
| 2006/0265689 A1* | 11/2006 | Kuznetsov et al. | 717/117 |

FOREIGN PATENT DOCUMENTS

WO    WO00/49521    8/2000

OTHER PUBLICATIONS

Rice, Frank C., "Protecting Personal Data in Your Microsoft Word Documents," http://msdn.Microsoft.com/library/en-us/dnword2k2/html/odc_ProtectWord.asp?frame=true, 8 pages, © 2005 Microsoft Corporation (printed Sep. 2, 2005).

(Continued)

*Primary Examiner*—Benjamin R Bruckart
(74) *Attorney, Agent, or Firm*—Merchant & Gould P.C.

(57) ABSTRACT

Systems and methods for detecting and removing metadata and hidden information from a file. A system can include a review module to identify metadata and hidden information, and a scrubber module for removing the metadata and hidden information from the file. The scrubber module can remove the metadata and hidden information automatically or upon prompting the user. The file can be a file attached to an electronic mail. The file can also be a file uploaded to a server.

5 Claims, 5 Drawing Sheets

OTHER PUBLICATIONS

"Remove Hidden Data in Microsoft Office," http://www.spywareguide.com/articles/article_show.php?id=35, 2 pages, © 2005 FaceTime Communications, Inc. (printed Sep. 7, 2005).

"ezClean, Version 3.3, User's Guide by KKL Software," front page, table of contents page, pp. 1-16 (printed Aug. 2004).

"ezClean, Version 3.3, Installation Guide and Admin Manual by KKL Software," front page, table of contents pp. 3, pp. 1-30 (printed Aug. 2004).

Kraft Kennedy & Lesser Inc., "Think Your Deletions Are Gone Forever? ezClean™ Makes Metadata Removal Easy!," http://www.kklsoftware.com/index.asp, 1 page (printed Aug. 2, 2004).

Kraft Kennedy & Lesser Inc., "ezClean, version 3.2," http://www.kklsoftware.com/products/ezClean/newfeatures_32.asp, 2 pages (printed Aug. 2, 2004).

Kraft Kennedy & Lesser Inc., "ezClean, version 3.3," http://www.kklsoftware.com/products/ezClean/newfeatures.asp, 2 pages (printed Aug. 2, 2004).

Kraft Kennedy & Lesser Inc., "ezClean, -Metadata removal utility for Microsoft Office," http://www.kklsoftware.com/products/ezClean/detail.asp, 3 pages (printed Aug. 2, 2004).

Kraft Kennedy & Lesser Inc., "ezClean, -Frequently Asked Questions," http://www.kklsoftware.com/products/ezClean/faq.asp, 3 pages (printed Aug. 2, 2004).

BEC Legal Systems, "Metadata Scrubber™," http://www.beclegal.com/lsy/lsylegspeclegbarmetadata.asp, 2 pages (printed Aug. 2, 2004).

Microsoft, "Office 2003/XP Add-in: Remove Hidden Data," http://www.microsoft.com/downloads/details.aspx?FamilyID-144e54ed-d43e-42ca-bc7b . . . , 3 pages (printed Aug. 2, 2004).

* cited by examiner

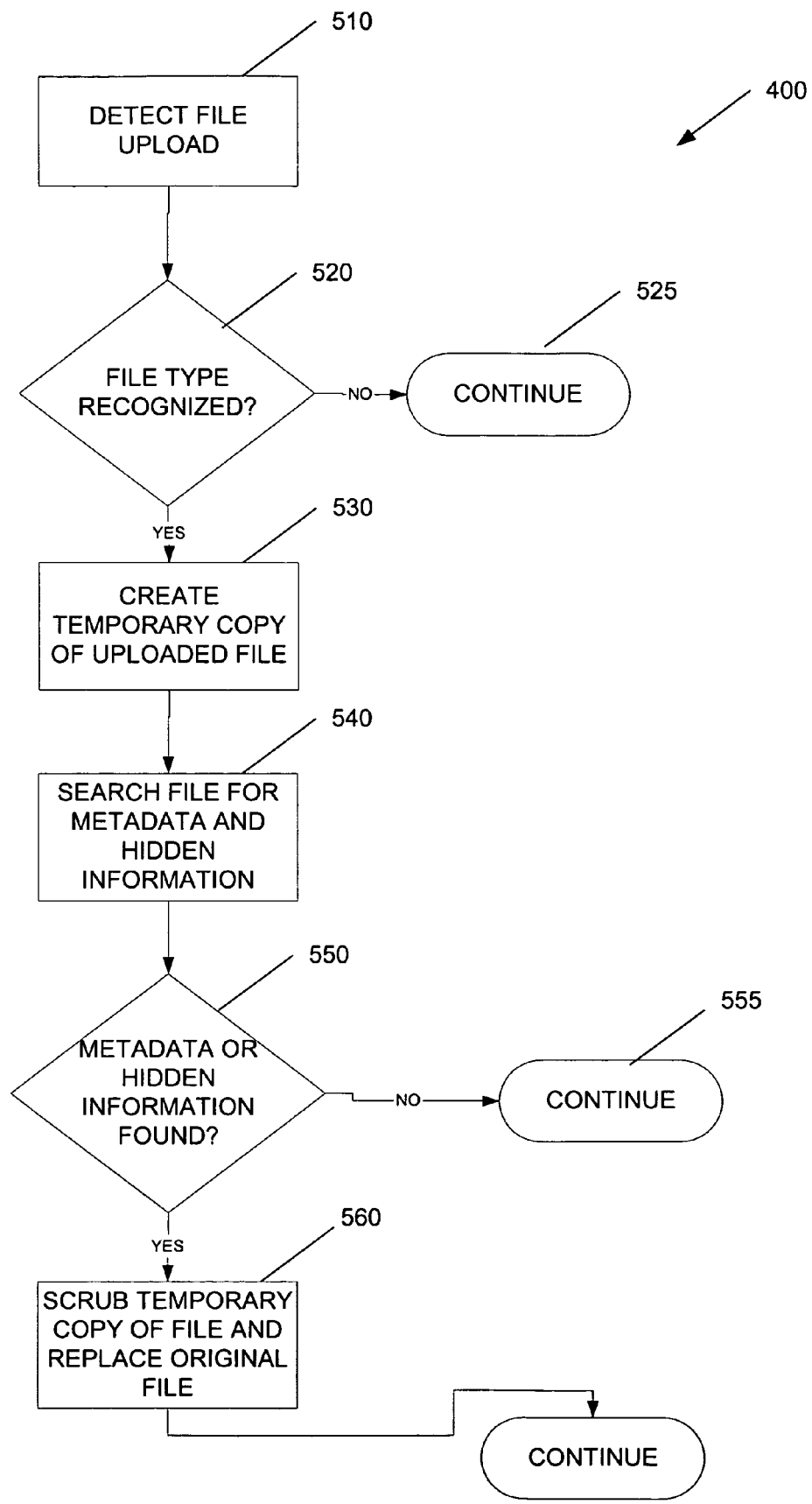

SYSTEMS AND METHODS FOR DETECTION AND REMOVAL OF METADATA AND HIDDEN INFORMATION IN FILES

TECHNICAL FIELD

Embodiments of the present invention relate to systems and methods for detection and removal of metadata and hidden information in files.

BACKGROUND

A computer file includes both the information (or data) making up the file as well as metadata, or data relating to attributes of the file itself. For example, a file typically includes metadata such as the document creator's name, the date the file was last saved, and the date the file was last printed. In addition, some files such as, for example, a Microsoft® Word document, can include hidden information that is not readily apparent to a user. For example, a Word document can include hidden information in the form of tracked changes and comments that may not be visible when the document is opened in certain document views.

When documents are shared between individuals, the metadata and/or hidden information in the documents can be problematic. For example, many important documents are communicated between individuals by attaching the documents to electronic mails. However, whenever a document is shared in its electronic form, the document has the potential of containing embarrassing or otherwise problematic metadata and hidden information.

For example, a consultant may take a document previously created for a first client and revise portions of the document with information related to a project for a second client. The consultant may not realize that the "track changes" option has been turned on before the revisions are made, especially if the consultant's document view is set to hide the tracked changes on the screen. When the consultant electronically mails the revised document to the second client, the second client can merely switch document views to view information relating to the first client that was deleted during revision of the document by the consultant. This can potentially lead to the inadvertent disclosure of the first client's confidential information to the second client.

Tools are available to assist a user in stripping metadata and hidden information from files. However, such tools are typically manual in nature and require the user to remember to run the tools to remove metadata and hidden information from the file before the file is shared with others. Further, such tools may not efficiently function in different types of collaboration environments.

It is therefore desirable to provide systems and methods that can efficiently detect and remove metadata and hidden information in files.

SUMMARY

Embodiments of the present invention relate to systems and methods for detecting and removing metadata and hidden information in files.

One aspect of the invention relates to a computing system including a plurality of files. The computing system can include a review module configured to parse an extensible markup language portion of a file to identify metadata and hidden information, and a scrubber module for removing the metadata and hidden information from the file.

Another aspect of the invention relates to a method for removing metadata and hidden information from a file attached to an electronic mail, the method including: checking a file type of the file to determine if the file type is recognized; if the file type is recognized, searching for metadata and hidden information by parsing an extensible markup language portion of the file; alerting a user if metadata and hidden information is found; and scrubbing the file to remove the metadata and hidden information.

Yet another aspect of the invention relates to a method for automatically removing metadata and hidden information from a file uploaded to a server, the method including: uploading the file to the server; upon upload, checking a file type of the file to determine if the file type is recognized; if the file type is recognized, searching for metadata and hidden information in the file; removing the metadata and hidden information; and making the file available on the server.

BRIEF DESCRIPTION OF THE DRAWINGS

Reference will now be made to the accompanying drawings, which are not necessarily drawn to scale, and wherein:

FIG. 5 illustrates an example method for detecting and removing metadata and hidden information from files uploaded to a server according to one embodiment of the present invention.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention relate to systems and methods for detecting and removing metadata and hidden information in files. For example, embodiments of the present invention relate to systems and methods that detect metadata and hidden information in files and automatically alert the user and/or remove the metadata and hidden information upon sharing of the file.

Examples of metadata and hidden information that can be associated with a particular computer file including the following: comments; revisions (tracked changes); deleted text; version information; electronic mail headers; routing slip information; personal summary information; user name; prior authors and editors; printer path name; template name, ink comments/annotations; scenario comments, unique suite identifiers (e.g., Microsoft® Office identifiers); document workspace information; and file path information. This list is not exhaustive—other types of metadata and hidden information can also be associated with a file.

Figure 1:
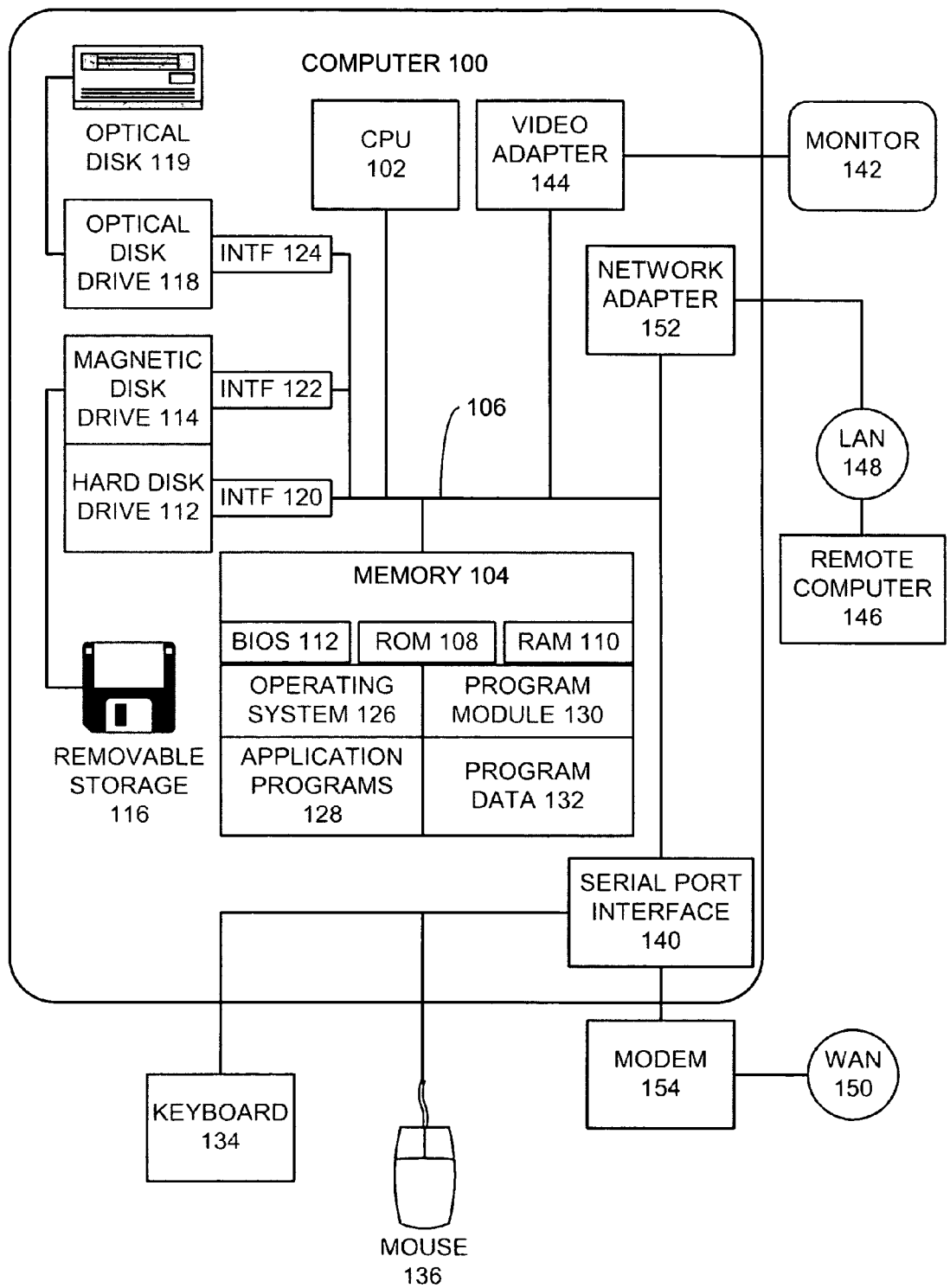
FIG. 1 illustrates an example general purpose computing system according to one embodiment of the present invention.

Referring now to FIG. 1, an example computer system 100 is illustrated. Computer system 100 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
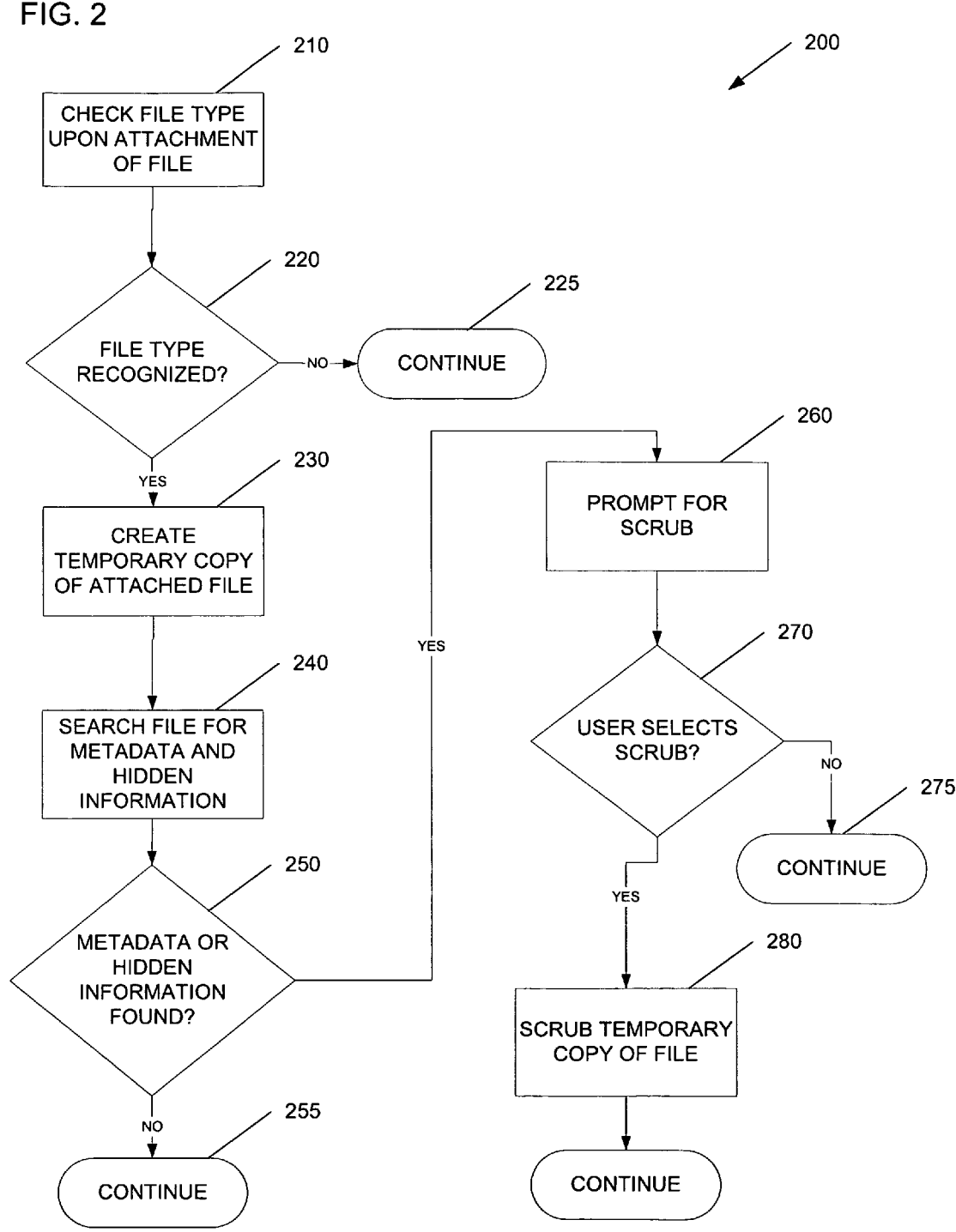
FIG. 2 illustrates an example method for detecting and removing metadata and hidden information from files attached to electronic mail according to one embodiment of the present invention.

Referring now to FIG. 2, an example method 200 for removing metadata and hidden information in files attached to electronic mail is shown. At operation 210, the file type (i.e., the type of information stored in the file, usually indicated by the extension of the file) of a file is checked when the file is attached to an electronic mail. At operation 220, a determination is made regarding whether the file type of the attached file is recognized as one potentially including metadata or hidden information. Only certain types of files include metadata and hidden information, so only certain types of files are examined for this information. In the example shown, the following types of files are recognized as potentially including metadata and hidden information: Microsoft® Word documents; Microsoft® Excel Documents; and Microsoft® PowerPoint® documents. In other embodiments, other file types can also be included.

If the file type of the attached file is not recognized, control is passed to operation 225 and standard operation continues. If the file type is recognized as potentially including metadata and hidden information, control is passed to operation 230, and a temporary copy of the file is made for analysis. In some embodiments, a temporary copy of the file is already made by the electronic mail program such as, for example, Microsoft® Outlook®, and this copy is analyzed. In other alternative embodiments, the original file itself is analyzed and a temporary copy is therefore not made.

Next, in operation 240, the file is searched for metadata and hidden information.

In one embodiment, the file is a container comprising multiple parts. One or more of the parts are based on the extensible mark-up language (XML). For example, documents in the Microsoft® Word 2003 format are made up of multiple parts including several XML-based parts. A program such as Microsoft® XML (MSXML) Parser can be used to parse the XML-based parts of the file to identify metadata and hidden information located in known areas of the XML schema. In one embodiment, an extensible stylesheet language transformation (XSLT) stylesheet is applied to the XML-based portions of the document using the MSXML Parser facilities. The MSXML Parser traverses the source XML tree of the file and writes output that signals the presence of, for example, hidden information such as tracked changes.

For example, the following example pseudocode illustrates a fragment of an XML document. The fragment includes the sentence "Here's a comment." A comment (i.e., "This is not good") is anchored to the last word of the sentence (i.e., "comment").

```
<w:p>
    <w:r><w:t>Here's a </w:t></w:r>
    <aml:annotation aml:id="0" w:type="Word.Comment.Start"/>
    <w:r><w:t>comment.</w:t></w:r>
    <aml:annotation aml:id="0" w:type="Word.Comment.End"/>
    <w:r>
        <w:rPr><w:rStyle w:val="CommentReference"/></w:rPr>
        <aml:annotation aml:id="0" aml:author="KHAIO-DEV"
        aml:createdate="2004-08-16T17:18:00Z" w:type="Word.Comment"
        w:initials="DEV">
            <aml:content>
                <w:p>
                    <w:pPr><w:pStyle
                    w:val="CommentText"/></w:pPr>
                    <w:r>
                        <w:rPr>
                            <w:rStyle
                            w:val="CommentReference"/>
                        </w:rPr>
                        <w:annotationRef/>
                    </w:r>
                    <w:r><w:t>This is not good.</w:t></w:r>
                </w:p>
            </aml:content>
        </aml:annotation>
    </w:r>
</w:p>
```

The above XML can be parsed, and XML tags indicating metadata and hidden information can be identified and removed. For example, in the above example pseudocode, the tag "aml:annotation" is identified as possibly including hidden information and, if desired, scrubbed so that the final scrubbed XML pseudocode would look like the following:

```
<w:p>
    <w:r><w:t>Here's a </w:t></w:r>
    <w:r><w:t>comment.</w:t></w:r>
</w:p>
```

In an alternative embodiment, the file is searched for metadata and hidden information by loading the file in the background into the native program which created the file. For example, if the attached file is a Microsoft® Word document, the document is loaded in the background by Microsoft® Word and then analyzed within Microsoft® Word to identify if the document includes metadata and/or hidden information.

Next, in operation 250, a determination is made regarding whether the file includes metadata or hidden information. If the file does not include such information, control is passed to operation 255 and standard operation continues. If the file does include metadata or hidden information, control is passed to operation 260, and the user is prompted to see if the user wants to "scrub" (i.e., remove) the file of such information.

Figure 3:
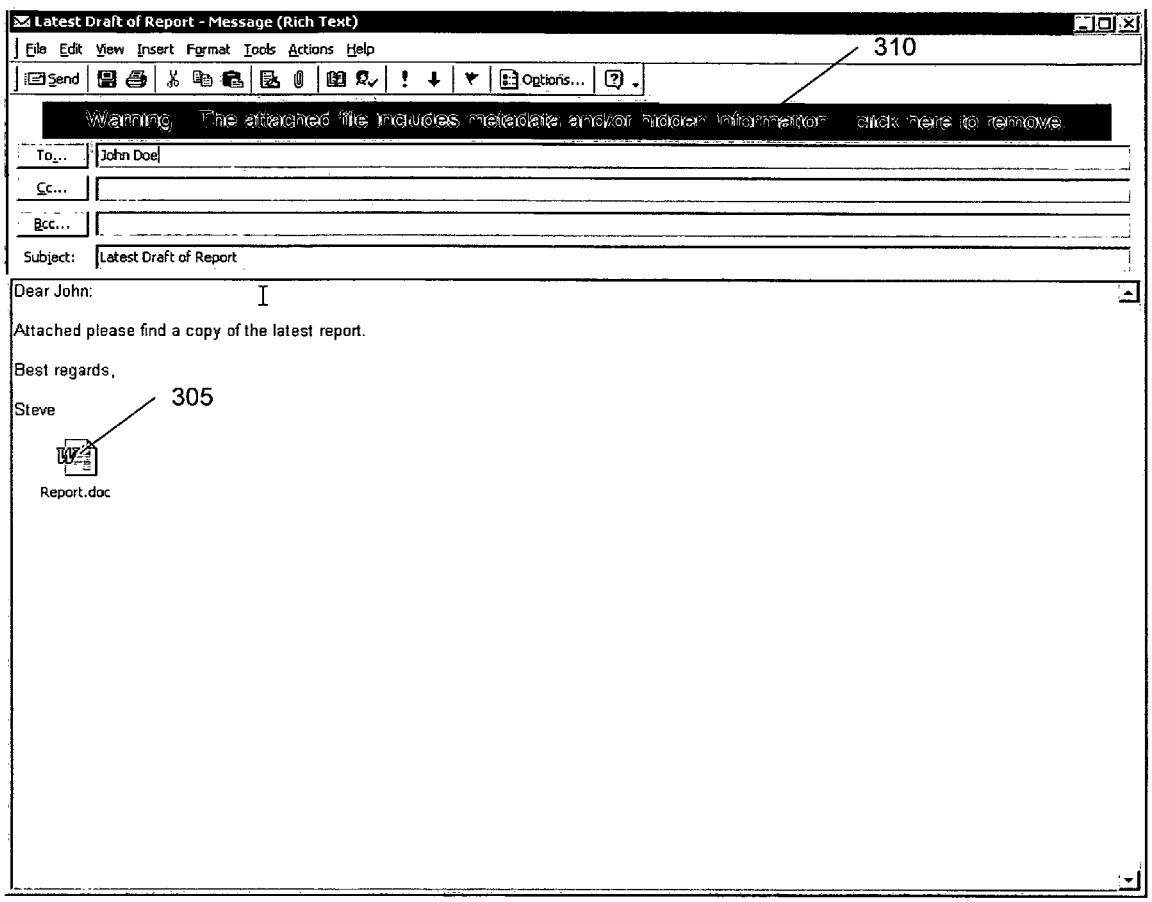
FIG. 3 illustrates an example electronic mail including an attached file according to one embodiment of the present invention.

For example, an example electronic mail 300 including an attached file 305 is illustrated in FIG. 3. If a determination is made upon attachment that file 305 includes metadata or hidden information, the user is alerted by a banner 310 placed in the header of electronic mail 300. The user can then click on banner 310 to remove the metadata and hidden information. Alternatively, if the user does not wish to remove the metadata and hidden information, the user can choose to simply ignore the banner 310 and continue to draft and send the electronic mail 300.

In other embodiments, different methods of alerting the user of metadata and hidden information can be used. For example, in one embodiment, the user is prompted by a dialog box that pops up warning of metadata and hidden information (i) when a file including metadata or hidden information is attached to an electronic mail, or (ii) when the user actually sends the electronic mail. In another embodiment, any files attached to an electronic mail can simply be automatically scrubbed when sent without any prompting or input from the user. For example, the user can create a rule using the Microsoft® Outlook® Rule Wizard that automatically checks and scrubs any attachments to electronic mail sent by the user.

Referring back to FIG. 2, once the user has been prompted in operation 260, control is then passed to operation 270 where it is determined whether or not the user wants to scrub the attached file. If the user chooses not to scrub the file, control is passed to operation 275 and standard operation continues. If the user chooses to scrub the file, control is passed to operation 280, where the temporary file is scrubbed. In some embodiments, if a separate temporary file was made to analyze and scrub, the temporary scrubbed file is the copy sent out with the electronic mail.

Generally, a file is scrubbed by removing some or all of the metadata and/or hidden information from the file. For example, another XSLT stylesheet that locates and removes hidden information can be applied to the document to remove metadata and hidden information. In one example, the MSXML API used to carry out XSLT to remove metadata and hidden information is IXMLDOMNode::transformNode (IXMLDOMNode*stylesheet, BSTR*xmlString).

In some embodiments, the user is provided with a list of the metadata and/or hidden information contained in a given file, and the user is allowed to decide which, if any, of the different types of metadata and/or hidden information to remove. For example, the user may choose to remove metadata associated with the authorship name and date, but to keep tracked changes.

In one example embodiment, method 200 is implemented in one or more modules provided as add-ins to Microsoft® Outlook®. The modules can monitor attached files, alert the user when attached files contain metadata and/or hidden information, and remove any such metadata and hidden information from the attached files.

Figure 4:
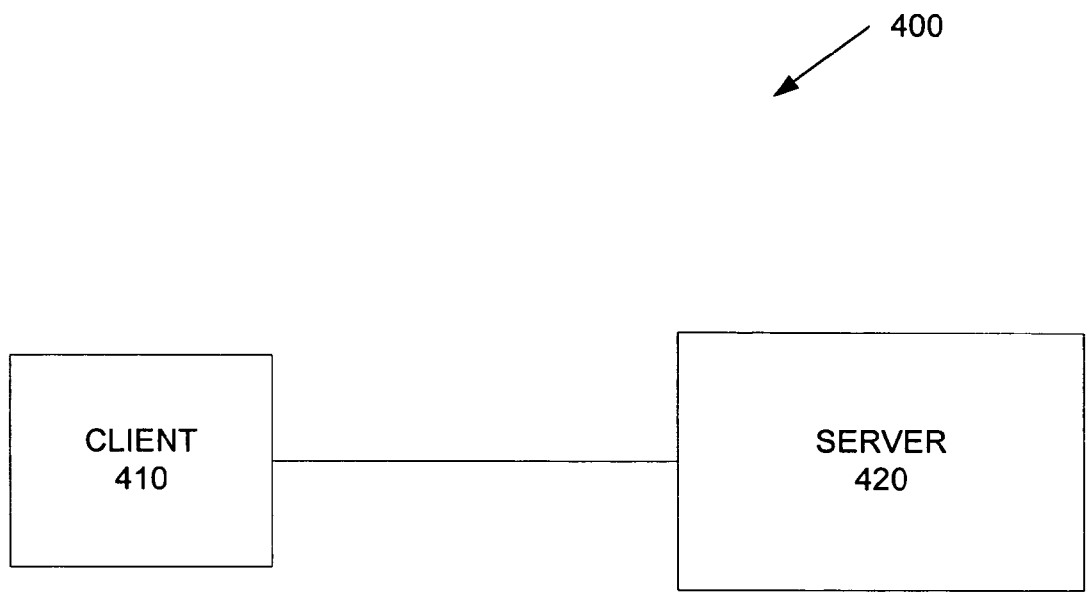
FIG. 4 illustrates an example computing environment including a client and a server according to one embodiment of the present invention.

Referring now to FIGS. 4 and 5, in another embodiment metadata and hidden information can be scrubbed from a file that is uploaded to a server such as a collaboration server or a document management server. For example, a user can share a file with other users by uploading the file to a Microsoft® SharePoint® Portal Server. However, it may be desirable to remove metadata and/or hidden information before the file is made available to other users.

In FIG. 4, an example computing environment 400 is illustrated including a client 410 configured in a manner similar to computing system 100 described above. Environment 400 also includes a server 420 in data communication with the client 410, such as a Microsoft® SharePoint® Portal Server. The client 410 can upload a file to server 420. Server 420 is configured to scrub the file automatically or upon prompting from the user when the file is uploaded to server 420.

Referring now to FIG. 5, an example method 500 for scrubbing a file uploaded to a server such as server 420 is illustrated. At operation 510, the server or a processes running thereon detects that a file has been uploaded. Next, at operation 520, the server determines whether the file type for the file is recognized. If the file type is not recognized, control is passed to operation 525 and standard processing of the upload continues. If the file type is recognized (e.g., Microsoft® Word documents, Microsoft® Excel Documents, and Microsoft® PowerPoint® documents), control is passed to operation 530, where a temporary copy of the file is made.

Next, in operation 540, the file is searched to identify any metadata or hidden information. For example, as noted above, Microsoft® Word 2003 documents, Microsoft® Excel 2003 Documents, and Microsoft® PowerPoint® 2003 documents each include XML-based content. The XML-based portions of these documents can be parsed to identify XML tags indicative of metadata and hidden information.

Next, in operation 550, a determination is made regarding whether metadata or hidden information is found in the file. If no metadata or hidden information is found in the file, control is passed to operation 555 and standard processing of the upload continues and any temporary copies of the file made for analysis can be deleted. If metadata or hidden information is found, control is passed to operation 560, and the temporary file is automatically scrubbed and written over the original file.

In alternative embodiments, the user is given a choice regarding whether or not to scrub the uploaded file. In another embodiment, the administrator of the server can develop a policy to define which files are scrubbed and whether scrubbing is automatic or prompted.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A method for removing metadata and hidden information from a file attached to an electronic mail, the method comprising:
   allowing a user to attach the file to an electronic mail using a computer including a processor executing the following steps:
   when the file is attached to the electronic mail, making a temporary copy of the file, and automatically checking a file type of the file to determine if the file type is recognized;
   if the file type is recognized, searching for metadata and hidden information by parsing an extensible markup language portion of the file;
   if the metadata or hidden information is found in the file, adding a banner to a header of the electronic mail prior to the user selecting to send the electronic mail to alert the user of the metadata and hidden information to remove;
   allowing the user to select the banner to initiate removal of the metadata and hidden information from the file;
   upon selection of the banner, providing a user a list of different types of the metadata and hidden information associated with the file attached to the electronic mail;
   allowing the user to select which of the different types of the metadata and hidden information to remove from the file; and
   scrubbing the file to remove the selected metadata and hidden information prior to the user selecting to send the electronic mail.

2. The method of claim 1, further comprising allowing a user to define a rule defining when a file is checked for metadata and hidden information.

3. A computer-readable storage medium readable by a computer and encoding instructions for executing the method recited in claim 1.

4. A computer-readable medium having computer-executable instructions for performing steps comprising:
   making a temporary copy of a file when the file is attached to an electronic mail;
   automatically checking a file type of the file to determine if the file type is recognized;
   if the file type is recognized, searching for metadata and hidden information by parsing an extensible markup language (XML) portion of the file and identifying XML tags indicating metadata and hidden information;
   determining whether the file includes metadata or hidden information;
   alerting a user if metadata and hidden information is found by adding a banner to a header of the electronic mail prior to the user selecting to send the electronic mail;
   allowing the user to select the banner to remove the metadata and hidden information;
   providing the user a list of the metadata and hidden information;
   allowing the user to select which of the different types of the metadata and hidden information to remove; and
   removing the XML tags and the selected metadata and hidden information prior to the user selecting to send the electronic mail.

5. The computer-readable medium of claim 4, further comprising allowing a user to define a rule defining when a file is checked for metadata and hidden information.

* * * * *